Patented Sept. 17, 1935

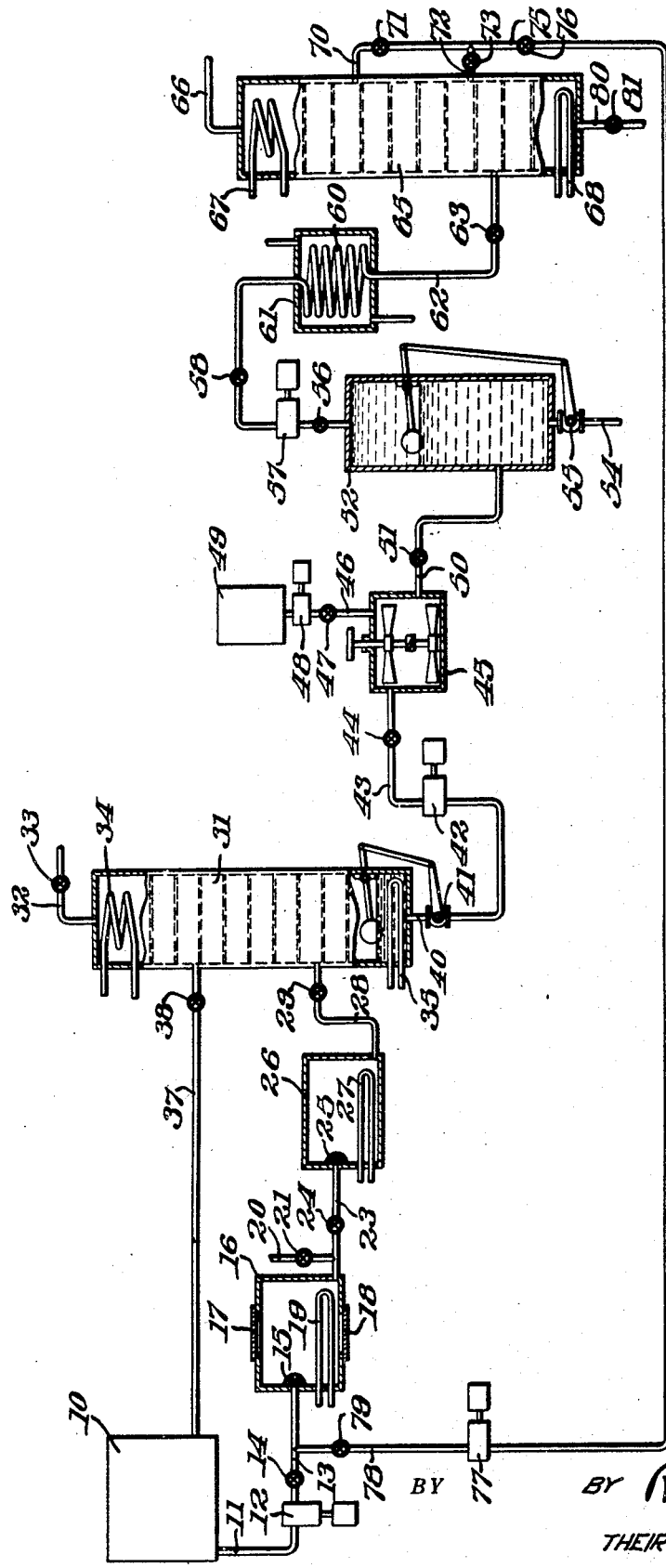

2,015,044

UNITED STATES PATENT OFFICE 2,015,044

CHLORINATION OF HYDROCARBONS

Charles F. Teichmann, Hugo Klein, and Carl P. Rathemacher, New York, N. Y.

Application April 1, 1933, Serial No. 663,936

4 Claims. (Cl. 260—166)

This invention relates to the halogenation of hydrocarbons and more particularly to a process of chlorinating hydrocarbons whereby mono-chlor compounds of the hydrocarbons are selectively produced.

The invention contemplates a method of chlorinating hydrocarbons wherein unreacted hydrocarbons are initially reacted with a reagent consisting of poly-chlor derivatives of the hydrocarbon in the presence of ultra-violet light to form mono-chlor derivatives of the hydrocarbon. The products of this reaction are then treated with free chlorine to bring about the chlorination of any remaining unreacted hydrocarbons. As products of the chlorination reaction, there are formed not only mono-chlor but also poly-chlor derivatives as well as hydrogen chloride. The chlor derivatives, after freeing them from hydrogen chloride, are separated into two fractions, one consisting of the mono-chlor compounds, and the other, of poly-chlor compounds. The former are collected as a final product while the latter are returned and reacted with fresh unreacted hydrocarbons in the manner previously described.

Chlorination reactions may be carried out either in the vapor phase or in the liquid phase. In the latter, the rate of chlorination is usually quite low and, as a result, recourse has been had to the use of catalysts for accelerating the reaction. Among the catalysts generally used are included finely-divided adsorbents, metallic chlorides, iodine and ultra-violet light. It is observed that both with and without the catalysts, poly-chlor compounds in considerable quantity are produced in addition to the desired mono-chlor compounds.

By carrying out the chlorination reaction in the vapor phase, much more rapid reaction is possible. However, the inherent disadvantage observed in the liquid phase operation is also observed here, namely, that, in addition to the formation of the desirable mono-chlor compounds, considerable proportions of the di- and tri-chlor derivatives are formed. It is also well known that the vapor phase reaction suffers from the further disadvantage that the reaction is highly exothermic and extreme care and control thereof is necessary.

The inventors have discovered that, when the undesirable poly-chlor compounds, which are formed in the course of the usual chlorination reaction, are mixed with unchlorinated hydrocarbons and the mixture so formed is then exposed in the form of a spray or fog to the action of ultra-violet light, the formation of considerable quantities of the desired mono-chlor compounds may be brought about. Although no theoretical explanation of the reaction is advanced, it is believed that, under the influence of the ultra-violet light radiation, a molecular rearrangement takes place, the chlorine molecules of the poly-chlor derivatives becoming labile or active and displacing a hydrogen molecule of the unreacted hydrocarbon, the hydrogen so displaced assuming the position of the chlorine in what was formerly the poly-chlor compounds. That this reaction takes place, in some such manner, is evidenced by the fact that very little liberation of hydrochloric acid is observed in the reaction.

We have also found that, when the reaction products produced as a result of the above reaction are subjected to reaction with chlorine to bring about the chlorination of the remaining quantities of unchlorinated hydrocarbons, no further radiation with ultra-violet light is necessary, the initial radiation sufficing for the catalysis of the reaction.

It is also noted that the reaction with chlorine is quite rapid and smooth which may be due to the fact that the solubility of the chlorine in the unchlorinated hydrocarbons is increased by the presence of mono-chlor compounds in which both the chlorine and the unchlorinated hydrocarbons are mutually miscible.

In reacting the unchlorinated hydrocarbons with the poly-chlor derivatives, the reaction may be carried out either in the liquid phase or in the vapor phase. However, the most efficient method appears to consist in atomizing both of the reactants to form a mist or fog and then radiating the same with ultra-violet light. In this way, even and rapid interaction may be brought about. As regards the subsequent chlorination of the products of this reaction, this, too, is most satisfactorily effected by atomizing the mixture of hydrocarbons and chlor derivatives and acting upon the resultant fog with chlorine.

The above described invention has been incorporated in a chlorination procedure which will be readily understood by reference to the accompanying drawing which shows in diagrammatic sectional elevation a desirable apparatus for carrying out the process.

The numeral 10 indicates a storage for hydrocarbons to be chlorinated. This storage vessel is connected by means of the line 11 with the intake side of the pump 12. This pump discharges through the line 13 controlled by the valve 14 into a reaction chamber 16 through a spray nozzle 15. The reaction chamber 16 which may be of any suitable shape constructed of material resistant to the action of hydrochloric acid. It is fitted on its upper and under sides with port holes 17 and 18 provided with a material pervious to ultraviolet light such as transparent quartz or "Pyrex" glass. This reaction chamber is also provided with a coil 19 through which either a cooling or a heating liquid may be circulated for the regulation of the temperature within the chamber. A lower point of the reaction chamber is fitted with a drawoff line 23 controlled by the valve 24, which line discharges through the spray nozzle 25 into the reaction chamber 26. Into the line 23 at a point intermediate the reaction chamber 16 and the control valve 23 there is fitted a line 20 controlled by the valve 21.

The reaction chamber 26 may be of a construction similar to that of chamber 16 except for the fact that it need not be provided with windows of ultra-violet pervious material. It is provided with temperature control means in the form of a heating or cooling coil 27 and with a drawoff line 28 controlled by the expansion valve 29 which line connects the bottom of the reaction chamber with a lower point in the fractionating tower 31.

The fractionating tower 31 may be of any conventional construction suitable for the distillation and rectification of compounds having different boiling points. The fractionating tower is fitted at its uppermost point with a vapor line 32 controlled by the valve 33 which leads to a hydrochloric acid system, not shown. It is provided at an upper point with a reflux cooling coil 34 through which a coolant or refrigerant may be circulated and at a lower point with a warming or heating coil 35. An upper point in the fractionating tower is also preferably fitted with a liquid drawoff line 37 controlled by the valve 38 leading to the storage tank 10. The bottom of the tower is provided with a drawoff line 40 controlled by the float controlled valve 41 which line connects with the intake side of the pump 42. This pump in turn discharges through the line 43 controlled by the valve 44 into the mixing chamber 46. The mixing chamber may be of any type suitable for the efficient agitation of liquids and is preferably fitted with a mechanical mixing or agitating device. To the mixing chamber there is connected the storage tank 49 through the line 46, the valve 47 and the pump 48. The mixing chamber is also fitted with a drawoff line 50 controlled by the valve 51 which leads to a separatory chamber 52. The bottom of the separatory chamber is fitted with a liquid drawoff line 54 controlled by the float controlled valve 55 while the top of the separator is fitted with a drawoff line 56 which connects through the pump 57 and the valve 58 with the coil 59 situated within the heating chamber 61 through which a heating medium such as hot oil may be circulated. The outlet side of the coil 59 is connected through the line 62 controlled by the valve 63 with the fractionating tower 65 at a lower point in its structure.

The tower 65 is fitted at its uppermost point with a vapor drawoff line 66 which leads to a condensing system, not shown. The tower is also provided at an upper point with a reflux cooling coil 67 and at a lower point with a heating coil 68 for imparting heat to the bottoms within the tower. The fractionating tower is provided at intermediate points in its structure with liquid drawoff lines 70 and 72 controlled respectively by the valves 71 and 73, which lines are manifolded to the line 75 controlled by the valve 76, which line connects with the intake side of the pump 77. This pump in turn discharges through the line 78 controlled by the valve 79 into the line 13 at a point intermediate the valve 14 and the reaction chamber 16.

The bottoms which remain as a residue at the bottom of the tower 65 may be withdrawn through the line 80 controlled by the valve 81 and passed to suitable storage, not shown.

In the typical operation of the present process, a petroleum hydrocarbon oil or a petroleum hydrocarbon such, for example, as a pentane fraction is drawn from the storage tank 10 by means of the pump 12 and delivered under a pressure which may be as high as several hundred pounds per square inch to the line 13 where it is mixed with poly-chlor compounds obtained from a later stage in the process, preferably in the ratio of four parts of pentane to each part of poly-chlor compounds. The mixture of the unchlorinated hydrocarbon and the poly-chlor compounds is discharged in the form of a spray into the reaction chamber 16 wherein it is subjected in a finely-divided form to the rays of ultra-violet light. The source of the ultra-violet light is preferably situated without the reaction chamber in order to prevent as far as possible the introduction of heat into the reaction.

The temperature maintained within the reaction chamber 16 must be kept within closely controlled limits in order to effect the highest possible conversion of the poly-chlor compounds into mono-chlor compounds. No specific temperatures can be given since the same is dependent largely upon the pressures used in the chlorination process. It is sufficient to say that the pressures used must be high enough to maintain the reacting hydrocarbon, in this case pentane, substantially in the liquid phase.

The products of the reaction which collect as a liquid at the bottom of the reaction chamber 16 are continuously withdrawn from that chamber into the line 23 into which a controlled quantity of chlorine is simultaneously introduced through the line 20 controlled by the valve 21. This mixture is then sprayed into the reaction chamber 26 wherein an extensive chlorination of any remaining unchlorinated hydrocarbons takes place. The reaction mixture is not subjected to the action of ultra-violet light since it has been found that by irradiating the reaction mixture in the first reaction chamber, the molecules of the reactants are made sufficiently active.

The quantity of chlorine supplied through the line 20 is carefully controlled to prevent as far as possible an unduly large formation of poly-chlor compounds. It must be recognized that the chorination with chorine as a reagent cannot be limited to the formation of the mono-chlor compounds alone since, in accordance with the recognized equilibria defined by chemical laws, certain definite percentages of both the di- and tri-chlor compounds are necessarily formed as by-products.

The pressure maintained within the reaction chamber 26 is preferably somewhat lower than that existing within the reaction chamber 16. The corresponding temperature in the reaction chamber 26 may be maintained within a somewhat higher range but must be closely controlled by the circulation of coolant through the coil 27 to prevent any undesirable and unduly rapid reaction. The reaction mixture which collects at the bottom of the reaction chamber 26 consists of a large percentage of mono-chlor compounds together with small percentages of poly-chlor compounds, unchlorinated hydrocarbons as well as some dissolved hydrochloric acid and excess chlorine. This mixture is drawn off through the line 28 and through the control valve 29 and flashed into the fractionating tower 31 wherein the chlorinated hydrocarbons are separated from the hydrochloric acid, free chlorine and unchlorinated hydrocarbons.

The temperature conditions within the fractionating tower are maintained within such limits as to permit of withdrawal of the hydrochloric acid gas and chlorine from the top of the tower through the vapor drawoff line 32. These vapors may then be delivered to a hydrochloric acid recovery apparatus where the hydrochloric acid is freed from chlorine and concentrated. The unchlorinated hydrocarbons which are separated in the course of the fractionation within the tower 31 are drawn off through the line 37 controlled by the valve 38 and returned to the storage 10 for unreacted hydrocarbons.

The mono- and poly-chlor compounds collect at the bottom of the fractionating tower 31 in a pool of controlled depth. These compounds are drawn off in a controlled stream through the line 40 controlled by the automatic valve 41 and led to the intake side of the pump 42 which delivers them under a pressure through the line 43 and the valve 44 into the agitating or mixing device 45 into which there is simultaneously pumped a controlled amount of wash water or preferably an aqueous alkaline solution from the tank 49. The agitation with the wash medium serves to remove from the chlor compounds any traces of either hydrochloric acid or free chlorine that are present therein.

The mixture of chlor compounds and wash medium is discharged from the mixing chamber 45 through the line 50 and delivered into the settling and separatory chamber 52 wherein the chlor compounds are settled free from the wash medium. The latter is continuously drawn off in a controlled stream through the line 54 controlled by the valve 55 while the supernatant layer of chlor compounds is removed through the line 56 by the pump 57 and delivered thereby under an elevated pressure into the heating coil 60 of the heater 61.

In order to heat the contents of the coil 60, there is circulated through the space surrounding the coils a heating medium which may be oil or some similar non-volatile material. After the chlor compounds have been heated to a temperature sufficiently high to permit of the vaporization of the mono- and poly-chlor compounds, the heated compounds are delivered through the line 62 and the valve 63 and flashed into the fractionating tower 65 which may be maintained at a pressure only slightly greater than atmospheric.

Under the conditions of temperature and pressure obtaining within the fractionating tower, the mono- and poly-chlor compounds of the hydrocarbon are substantially vaporized and, by properly controlling the temperature difference within the tower, the mono-chlor compounds may be taken off from the top of the tower through the line 66 as a definite fraction. The di- and tri-chlor compounds, on the other hand, are taken off as side fractions from the tower through the lines 70 and 72 which leave the tower at intermediate points in its structure. The residues which collect at the bottom of the tower consist of polymers as well as highly complex chlor derivatives and these are drawn off through the line 80 controlled by the valve 81 and lead to a suitable storage.

The di- and tri-chlor compounds which are produced as side fractions are drawn off through the line 75 controlled by the valve 76 and delivered to the pump 77 which, in turn, delivers them under a suitable pressure into the line 13 where they are mixed with unchlorinated hydrocarbons.

Although the chlorination of pentane has been described in the aforegoing example, the process is not limited to either definite hydrocarbons or to definite fractions of hydrocarbons. It is applicable to hydrocarbon mixtures consisting of widely varying constituents. Chlorination of different compounds requires the application of different conditions so that no definite temperature or pressure ranges may be consistently given. It may be pointed out, however, that most effective reactions are obtained when the pressures used are sufficiently high to prevent any undue vaporization of either the hydrocarbons or the poly-chlor derivatives thereof.

Obviously many modifications and variations of the invention, as hereinbefore set forth, may be made without departing from the spirit and scope thereof, and therefore only such limitations should be imposed as are indicated in the appended claims.

We claim:

1. The process of preparing mono-chlor derivatives of paraffinic hydrocarbons which comprises initially reacting the hydrocarbons with a reagent consisting of poly-chlor derivatives of the hydrocarbons in the presence of ultra-violet light and substantially in the liquid phase, then submitting the reaction products to a reaction with chlorine under such pressure as to maintain the reaction products substantially in the liquid phase whereby mono-chlor and poly-chlor compounds as well as hydrochloric acid are formed, removing the hydrochloric acid and separating the chlor compounds into two fractions, the one comprising the mono-chlor derivatives and the other, the poly-chlor derivatives.

2. The process of preparing mono-chlor derivatives of paraffinic hydrocarbons which comprises initially reacting the hydrocarbons with a reagent consisting of poly-chlor derivatives of the hydrocarbons in the presence of ultra-violet light and substantially in the liquid phase, then submitting the reaction products to a reaction with chlorine under such pressure as to maintain the reaction products substantially in the liquid phase whereby mono-chlor and poly-chlor compounds as well as hydrochloric acid are formed, removing the hydrochloric acid, separating the chlor compounds into two fractions, the one comprising the mono-chlor derivatives and the other, the poly-chlor derivatives and recycling the latter to react with the unchlorinated hydrocarbon.

3. The process of preparing mono-chlor derivatives of paraffinic hydrocarbons which comprises mixing the hydrocarbons with a reagent consisting of poly-chlor derivatives of the hydrocarbons to form a mixture, atomizing the mixture to form a mist and subjecting the mist to reaction while maintained substantially in the liquid phase and in the presence of ultra-violet light, then mixing the reaction products with chlorine, atomizing the mixture to form a mist while maintained substantially in the liquid phase whereby mono-chlor and poly-chlor compounds as well as hydrochloric acid are formed, removing the hydrochloric acid and separating the mono-chlor compounds from the poly-chlor compounds by distillation.

4. The process of preparing mono-chlor derivatives of paraffinic hydrocarbons which comprises mixing the hydrocarbons with a reagent consisting of poly-chlor derivatives of the hydrocarbons to form a mixture, atomizing the mixture to form a mist and subjecting the mist to reaction in the presence of ultra-violet light while maintained substantially in the liquid phase, then mixing the reaction products with chlorine, atomizing the mixture to form a mist while maintained substantially in the liquid phase whereby mono-chlor and poly-chlor compounds as well as hydrochloric acid are formed, removing the hydrochloric acid, separating the mono-chlor compounds from the poly-chlor compounds by distillation and recycling the latter to react with the unchlorinated hydrocarbon.

CHARLES F. TEICHMANN.
    HUGO KLEIN.
    CARL P. RATHEMACHER.